(No Model.) 2 Sheets—Sheet 1.
T. J. THORP.
FENCE WIRE STRINGING IMPLEMENT.
No. 457,138. Patented Aug. 4, 1891.
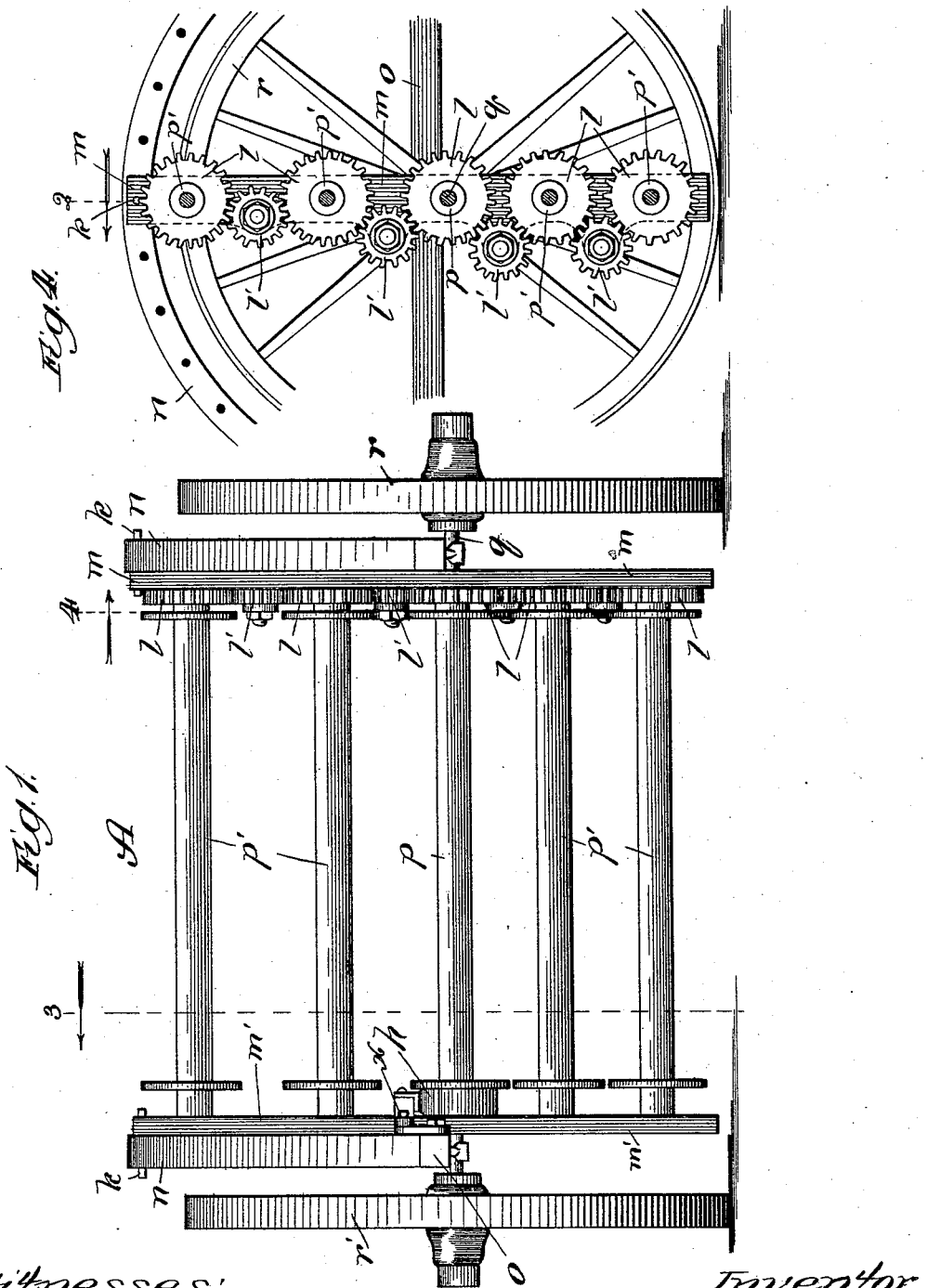

(No Model.)　　　　　　　　　　　　　　　2 Sheets—Sheet 2.
T. J. THORP.
FENCE WIRE STRINGING IMPLEMENT.
No. 457,138.　　　　　　　　　　Patented Aug. 4, 1891.
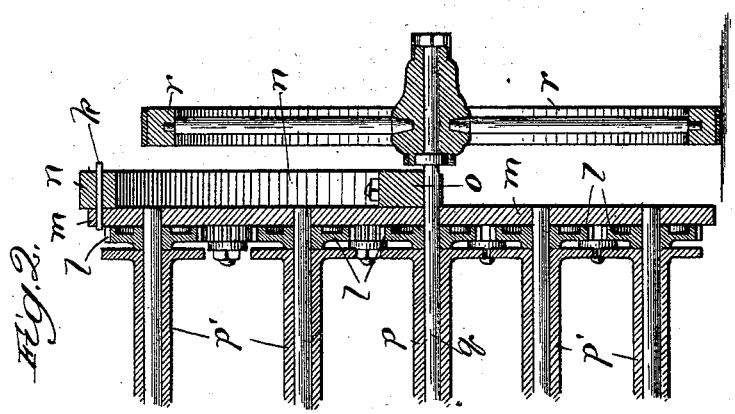
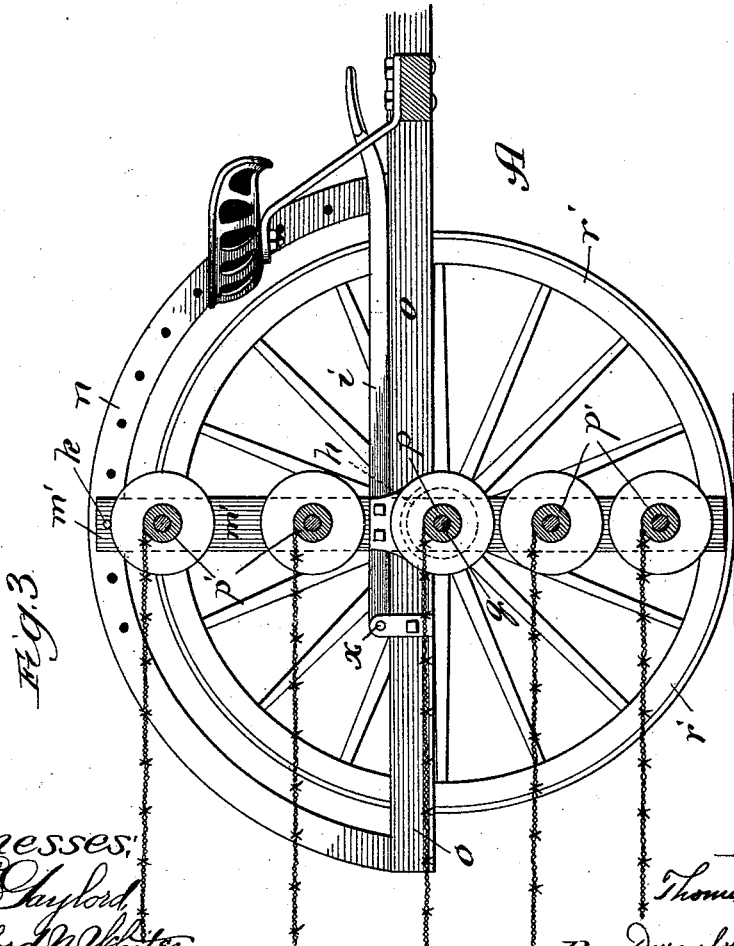

UNITED STATES PATENT OFFICE.

THOMAS J. THORP, OF CHICAGO, ILLINOIS, ASSIGNOR TO THE AMERICAN STEEL POLE AND POST COMPANY, OF SAME PLACE.

FENCE-WIRE-STRINGING IMPLEMENT.

SPECIFICATION forming part of Letters Patent No. 457,138, dated August 4, 1891.

Application filed February 25, 1891. Serial No. 382,766. (No model.)

*To all whom it may concern:*

Be it known that I, THOMAS J. THORP, a citizen of the United States, residing at Chicago, in the county of Cook and State of Illinois, have invented a new and useful Improvement in Fence-Wire-Stringing Implements, of which the following is a specification.

The object of my invention is to provide an improved implement for use in building wire fences to facilitate the stringing of the wires from post to post. To the desired end I provide a wheeled vehicle on which is supported frame-work carrying as many spools for the wire as there are lines thereof to be strung for the fence, and the means hereinafter described for controlling the paying-off of the wire from the implement.

In the accompanying drawings, Figure 1 is a view in rear elevation of my improved implement. Fig. 2 is a broken sectional view of the same, the section being taken at the line 2 on Fig. 4 and viewed in the direction of the arrow. Figs. 3 and 4 are views of the same in sectional side elevation, taken respectively on the lines 3 and 4 of Fig. 1 and viewed in the directions indicated by the arrows.

A is a vehicle, preferably of the two-wheeled variety illustrated, the wheels $r$ and $r'$ of which should be revoluble on a stationary axis $q$, surrounded by the hollow spindle of a reel or spool $p$, extending between the sides of a rectangular frame $o$, rigidly secured to the axle, and the sides of which may be extended forward to form the thills of the vehicle if it be drawn by horse-power or the handles of the vehicle if it be drawn by hand-power. On the frame $o$, and preferably but not necessarily at each side thereof, is secured a segment $n$, having at intervals perforations $n'$, for purposes hereinafter described. These perforations constitute the segment, practically a segmental rack, which in fact it may be. At the spindle of the reel $p$ at the opposite inner sides of the frame $o$, are loosely supported uprights $m$ and $m'$, forming bearings for spools $p'$. Each reel carries near one of its journal ends, preferably at the inner side of the upright bearing $m$, a cog-wheel $l$, between the members of each adjacent pair of which is journaled an idler cog-wheel $l'$, connecting the pairs to transmit the motion from one gear $l$ to another. The uprights are adapted to be secured in any position to which they may be adjusted about their axis by a pin $k$, inserted through each near its upper end into the proper hole in the adjacent rigid segment or holder $n$. A lever $i$ is pivoted at $x$ on the frame $o$ to extend forward into position accessible to a foot of the driver, who occupies the seat $g$, if the implement be designed to be worked by horse-power, and the lever carries a brake-shoe $h$, over the sleeve or spindle $p$ on the shaft $q$.

The machine is designed for use in building fences formed with wires (barbed or plain) strung at vertical intervals on posts, and its manner of operation is as follows: The reels of the wire employed are journaled between the bearings $m$ $m'$, one such reel being provided for each line of wire to be strung, and the inclination from the vertical of the bearings $m$ $m'$ to which they are adjustable by inserting their retaining-pins $k$ in the holes in segments $n$ is arranged according to the distance desired between the several wires of the fence. An end of the wire on each reel is fastened to the first fence-post or other stationary object, and the vehicle is moved to the next post, its movement causing the reels to pay off their wire, the speed of paying off and the tension to which the wire is stretched being controllable by pressure exerted on the brake $h$ through the medium of the lever $i$, while the gear connection between the reels insures the uniformity of their paying-off action.

When the device is not in use for stringing wire to build fence, the bearings $m$ $m'$ may be turned down and held by their pins $k$ in horizontal positions out of the way of obstructions on the ground in the path of travel of the vehicle.

As will readily be seen, my improved device affords convenient, simple, and effective means for the purpose stated, and the construction thereof shown and described is believed best to adapt it thereto, though it may be variously modified as to details without departure from my invention.

What I claim as new, and desire to secure by Letters Patent, is—

1. In a fence-wire-stringing implement, the combination of a wheeled vehicle having uprights supported between their extremities near opposite sides of the vehicle to extend above and below the line of the axle, and a desired number of reels for wire journaled in the said uprights and revoluble to pay off the wire when fixed at one end to a stationary object by movement of the vehicle, substantially as described.

2. In a fence-wire-stringing implement, the combination of a wheeled vehicle having uprights journaled between their extremities on the axle and adjustable thereon to different angles, holding means for the uprights in their adjusted positions, and reels for wire journaled in the said uprights and geared together and revoluble to pay off the wire when fixed at one end to a stationary object by movement of the vehicle, substantially as described.

3. In a fence-wire-stringing implement, the combination of a wheeled vehicle having a frame $o$, carrying segments $n$, bearings $m$ and $m'$, supported adjacent to the segments and adjustable to different angles, and reels for wire journaled in said bearings and geared together, substantially as described, the reels being revoluble to pay off their wire when the same is fixed at one end to a stationary object by movement of the vehicle, substantially as set forth.

4. A fence-wire-stringing implement comprising, in combination, a two-wheeled vehicle A, having a frame $o$ on its axle $q$, segments $n$ on opposite sides of the frame, bearings $m$ and $m'$, adjustably supported on the axle, reels for wire journaled in said bearings and geared together, substantially as described, the reels being revoluble to pay off their wire when the same is fixed at one end to a stationary object by movement of the vehicle, and a brake for the reels, substantially as set forth.

THOMAS J. THORP.

In presence of—
J. W. DYRENFORTH,
M. J. FROST.